(12) United States Patent  
Matsuzaki et al.

(10) Patent No.: US 11,763,418 B2  
(45) Date of Patent: Sep. 19, 2023

(54) IMAGE PROCESSING DEVICE, IMAGE PROCESSING METHOD, AND COMPUTER PROGRAM

(71) Applicant: EIZO Corporation, Hakusan (JP)

(72) Inventors: Hiroki Matsuzaki, Hakusan (JP); Tsubasa Ito, Hakusan (JP); Tomoya Nakamura, Hakusan (JP); Kenichi Kagawa, Hakusan (JP)

(73) Assignee: EIZO Corporation, Hakusan (JP)

( * ) Notice: Subject to any disclaimer, the term of this patent is extended or adjusted under 35 U.S.C. 154(b) by 228 days.

(21) Appl. No.: 17/599,137

(22) PCT Filed: Apr. 12, 2019

(86) PCT No.: PCT/JP2019/015974  
§ 371 (c)(1),  
(2) Date: Sep. 28, 2021

(87) PCT Pub. No.: WO2020/208809  
PCT Pub. Date: Oct. 15, 2020

(65) Prior Publication Data  
US 2022/0172317 A1 Jun. 2, 2022

(51) Int. Cl.  
*G06T 1/20* (2006.01)
(52) U.S. Cl.  
CPC ..................... *G06T 1/20* (2013.01)
(58) Field of Classification Search  
CPC ........................................................ G06T 1/20  
See application file for complete search history.

(56) References Cited

U.S. PATENT DOCUMENTS

| 10,929,464 | B1* | 2/2021 | Zuczek ................. G06F 16/738 |
| 2007/0009181 | A1* | 1/2007 | Leung ..................... G06T 3/606 382/296 |
| 2015/0009410 | A1* | 1/2015 | Ikushima ................. G09G 5/00 348/724 |
| 2020/0175942 | A1 | 6/2020 | Matsuzaki et al. |

FOREIGN PATENT DOCUMENTS

| JP | H03-212067 A | | 9/1991 |
| JP | H03212067 A | * | 9/1991 |
| JP | 2002-290741 A | | 10/2002 |

(Continued)

OTHER PUBLICATIONS

International Search Report dated May 28, 2019 in corresponding International Application No. PCT/JP2019/015974; 4 pages.

*Primary Examiner* — Xin Sheng  
(74) *Attorney, Agent, or Firm* — Maier & Maier, PLLC

(57) ABSTRACT

An object of the present invention is to provide an image processing device, an image processing method, and a computer program that can reduce the toggle rate without degrading image data. The present invention provides an image processing device that processes image data comprising: a first processing unit, wherein the first processing unit is configured to receive input pixel data and output output pixel data, the input pixel data includes sequential pixel data which is pixel data having N sequential pixel data (N≥3), and the output pixel data includes data in which the pixel data included in the sequential pixel data is sorted based on a similarity of the pixel data included in the sequential pixel data.

7 Claims, 12 Drawing Sheets

(56) References Cited

FOREIGN PATENT DOCUMENTS

| | | | |
|---|---|---|---|
| JP | 2003-250031 A | | 9/2003 |
| JP | 2004-194155 A | | 7/2004 |
| JP | 2004194155 A | * | 7/2004 |
| JP | 2014-116750 A | | 6/2014 |
| JP | 2019-016304 A | | 1/2019 |

* cited by examiner

BEFORE SORTING TOTAL OF HAMMING DISTANCES D0 = d(a,b) + d(b,c)

AFTER SORTING TOTAL OF HAMMING DISTANCES D1 = d(a,c) + d(c,b)

D0−D1= d(a,b) − d(a,c)

COLUMN 1   COLUMN 2

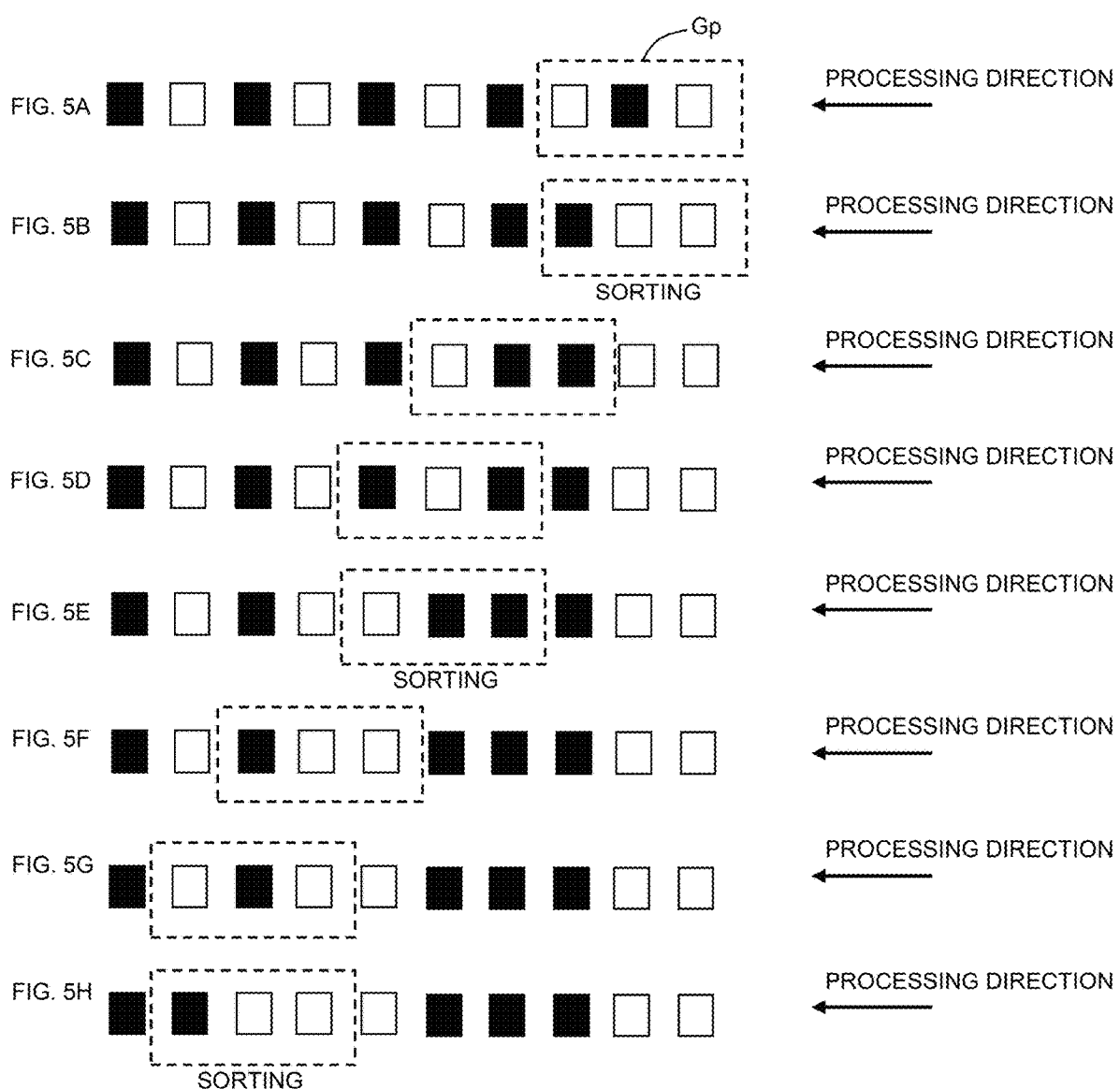

FIG. 8
BEFORE SORTING
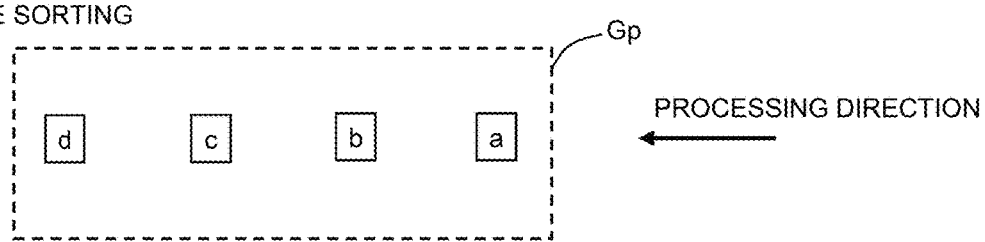
AFTER SORTING
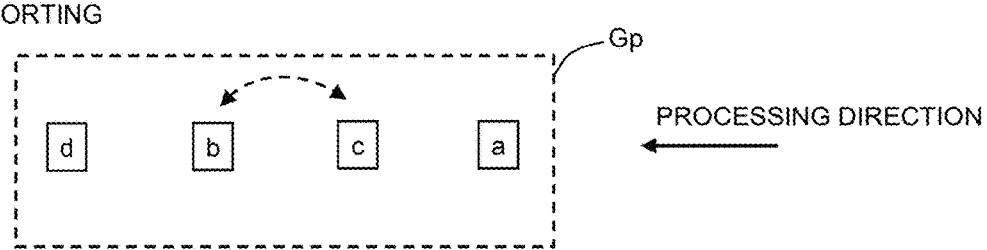
BEFORE SORTING TOTAL OF HAMMING DISTANCE D0 = d(a,b) + d(b,c) + d(c,d)
AFTER SORTING TOTAL OF HAMMING DISTANCE D1 = d(a,c) + d(c,b) + d(b,d)
D0-D1= d(a,b) + d(c,d) - d(a,c) - d(b,d)

IMAGE PROCESSING DEVICE, IMAGE PROCESSING METHOD, AND COMPUTER PROGRAM

TECHNICAL FIELD

The present invention relates to an image processing device, an image processing method, and a computer program.

BACKGROUND ART

An image processing device is used to perform image processing in a variety of fields. For example, an image display device (such as an LCD) that displays images incorporates the image processing device. Data handled by the image processing device is pixel data related to pixels that comprise the image. The pixel data corresponding to a single pixel, for example, has a single or plurality of bits of information representing luminance values. If the image data is monochrome, the pixel data is, for example, 8 bits (0 to 255), and if the image data is RGB color, the pixel data is, for example, 24 bits (0 to 255 for each RGB).

In recent years, image processing devices have become more and more complex, with various image processing circuits (including FPGAs and ASICs) and communication systems. In particular, depending on the input image data, the processing system may consume high power. As power consumption increases, heat generation also increases, and thus the temperature rise of the image processing device becomes a major problem. To solve this problem, the image processing device is equipped with heat dissipation fins to increase the heat dissipation from the image processing device. However, such solutions lead to increased costs, for example.

Here, the information processing device that suppresses power consumption by reducing a toggle rate has been proposed (for example, Patent Literature 1). The information processing device in patent literature 1 is configured to invert the lower bits of data based on a hamming distance between the data and reduce the toggle rate.

CITATION LIST

Patent Literature

[Patent Literature 1] Japanese Unexamined Patent Application Publication No. 2014-116750

SUMMARY OF INVENTION

Technical Problem

The information processing device described in patent literature 1 is configured to invert the lower bits of the data, which means that the data itself is modified. Therefore, if the information processing device described in the patent literature 1 is applied to an image processing to reduce the toggle rate, the pixel data itself will be modified and the image data may be degraded.

An object of the present invention is to provide an image processing device, an image processing method, and a computer program that can reduce the toggle rate without degrading image data.

Solution to Problem

The present invention provides an image processing device that processes image data comprising: a first processing unit, wherein the first processing unit is configured to receive input pixel data and output output pixel data, the input pixel data includes sequential pixel data which is pixel data having N sequential pixel data (N≥3), and the output pixel data includes data in which the pixel data included in the sequential pixel data is sorted based on a similarity of the pixel data included in the sequential pixel data.

In the present invention, the image processing device outputs the output pixel data that includes the data in which the pixel data of the input pixel data is sorted based on the similarity of the pixel data of the input pixel data. Since the output pixel data is sorted based on the similarity of the pixel data, the toggle rate is reduced when the output pixel data is image processed. Also, since the output pixel data includes the data in which the pixel data of the input pixel data is sorted, and the pixel data itself is retained, the image data is avoided to be degraded.

Various embodiments of the present invention are described below. Any of the embodiments described below can be combined with one another.

Preferably, the first processing unit includes a similarity calculation unit and a sorting unit, the similarity calculation unit calculates the similarity of the pixel data included in the sequential pixel data for the respective sequential pixel data, and the sorting unit sorts the pixel data included in the sequential pixel data based on the similarity.

Preferably, the similarity calculation unit calculates the similarity based on a hamming distance between adjacent the pixel data included in the sequential pixel data.

Preferably, the sorting unit sorts the pixel data included in the sequential pixel data based on first and second similarities, the sequential pixel data has a plurality of pairs of the adjacent the pixel data, the first similarity corresponds to a sum of the hamming distances between the plurality of pairs of the adjacent the pixel data, and the second similarity corresponds to a sum of the hamming distances between the plurality of pairs of the adjacent the pixel data when the pixel data of the sequential pixel data corresponding to the first similarity is sorted.

Preferably, the pixel data has a plurality of bits, and the similarity calculation unit calculates the hamming distance using upper bit of the pixel data.

Preferably, the first processing unit includes a determination unit, and the determination unit determines the sequential pixel data so that the pixel data which has been sorted is not sorted again.

Preferably, the image processing device further comprises: a second processing unit, wherein the second processing unit includes a restoration unit, the first processing unit includes an order acquisition unit, the order acquisition unit acquires order data and outputs the order data to the second processing unit, the order data defines an order of the pixel data of the sequential pixel data in the state before the pixel data is sorted, and the restoration unit restores the order of the pixel data of the sequential pixel data based on the order data.

Preferably, the image processing device further comprises: an image processing unit, wherein the pixel data of the image data flows in an order of the first processing unit, the image processing unit, and the second processing unit, and the image processing unit performs predetermined processing on the pixel data.

Preferably, an image processing method that processes image data comprising: an input step; and an output step, wherein in the input step, input pixel data is received to a first processing unit, and in the output step, output pixel data is output from the first processing unit, the input pixel data includes sequential pixel data which is pixel data having N sequential pixel data (N≥3), and the output pixel data includes data in which the pixel data included in the sequential pixel data is sorted based on a similarity of the pixel data included in the sequential pixel data.

Preferably, a computer program causing a computer to execute an image processing method that processes image data comprising: an input step; and an output step, wherein in the input step, input pixel data is received to a first processing unit, and in the output step, output pixel data is output from the first processing unit, the input pixel data includes sequential pixel data which is pixel data having N sequential pixel data (N≥3), and the output pixel data includes data in which the pixel data included in the sequential pixel data is sorted based on a similarity of the pixel data included in the sequential pixel data.

BRIEF DESCRIPTION OF DRAWINGS

FIGS. 5A to 5H shows the image processing device relating to the embodiment performing sequential sorting processing on the pixel data included in sequential pixel data Gp.

FIG. 8 is a description diagram of the hamming distance before and after sorting in the modification 1.

DESCRIPTION OF EMBODIMENTS

Hereinafter, embodiments of the present invention will be described with reference to the drawings. Any of the embodiments described below can be combined with one another. And the invention is established independently for each feature.

1. EMBODIMENT 1-1. Description of the Overall Configuration

Figure 1:
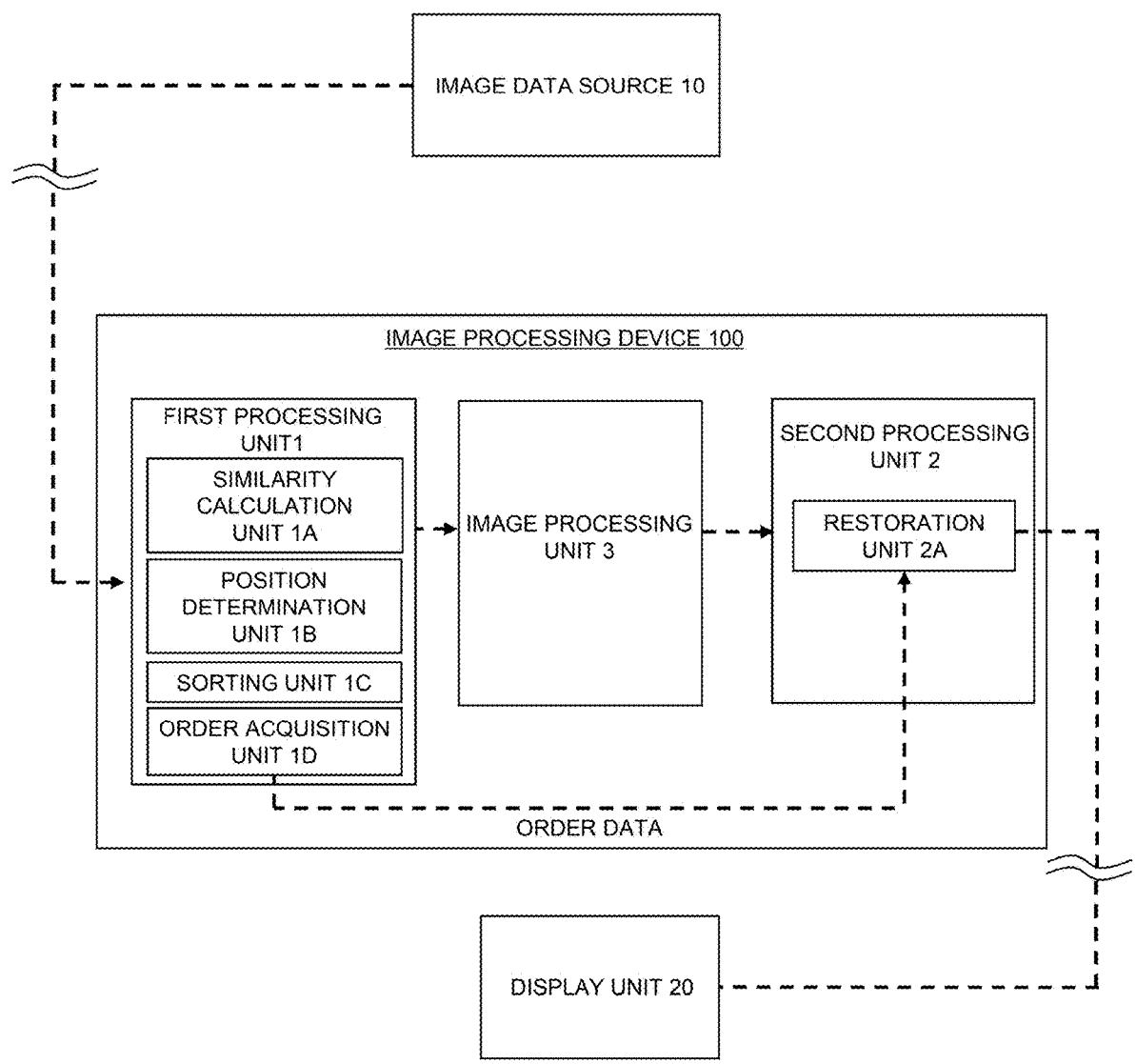
FIG. 1 is a functional block diagram of an image processing device 100 relating to the embodiment.

Based on FIGS. 1 and 2, the overall configuration of the image processing device 100 will be described. The image processing device 100 includes the first processing unit 1, the second processing unit 2, and the image processing unit 3, as shown in FIG. 1.

Each of the above components may be realized by software or by hardware. When realized by software, various functions can be realized by the CPU executing the computer program. The program may be stored in built-in memory or a computer-readable non-transitory storage medium. Further, the program stored in the external the memory may be read and realized by so-called cloud computing. When realized by hardware, it can be realized by various circuits such as ASIC, FPGA, or DRP. The present embodiment deals with various information and concepts encompassing the same, which are represented by high and low signal values as a collection of binary bits consisting of 0 or 1, and communication and arithmetic operations can be performed by the above software or hardware manner.

The image processing device 100 and the display unit 20 are mounted on an image display device connected to a personal computer, for example. The image processing device 100 may be mounted on the personal computer, and the display unit 20 may be mounted on the image display device. The image processing device 100 is configured to acquire the image data from the image data source 10, perform image processing (e.g., tone correction) on the image data, and output the image data that has been image processed to the display unit 20. The image data that the image processing device 100 acquires from the image data source 10 includes the input pixel data. The input pixel data includes a plurality of the pixel data. The pixel data includes data related to the tone value and is an arbitrary number of bits. In the embodiment, the case where the image data is 1-bit monochrome pixel data is described as an example, but the embodiment is also applicable to the case where the image data is RGB color. The image processing unit 3 of the image processing device 100 processes the pixel data sequentially. In this embodiment, the processing performed in the first processing unit 1 and the second processing unit 2 can suppress the toggle rate in the image processing unit 3 and reduce the power consumption (logic power consumption) in the image processing unit 3 while avoiding the degradation of the image data. The configuration of the first processing unit 1 and the second processing unit 2 will be explained in detail later.

The image data source 10 generates a video signal, which is a sequence of pixel data including luminance and color information, and is not limited to any particular type. The image data source 10 can be, for example, a personal computer, a vision sensor (camera), or a video playback device. In FIG. 1, the image data source 10 and the image processing device 100 are shown as separate entities, but they are not limited to this form and maybe the same entity.

The display unit 20 is a medium that displays the image data processed by the image processing device 100 as an image based on the pixel data when the image data is input. The display unit 20 is, for example, an LCD monitor, a CRT monitor, or an OLED monitor.

2. CONFIGURATION DESCRIPTION 2-1. First Processing Unit 1

Based on FIGS. 1 to 5H, the configuration elements, etc. of the image processing device 100 of the embodiment will be described.

The first processing unit 1 is configured to receive the input pixel data and to output the output pixel data. The input pixel data includes the sequential pixel data Gp, which is pixel data having N (N≥3) sequential pixel data. The output pixel data is the data that is sorted based on the similarity of the pixel data included in the sequential pixel data Gp. The similarity varies based on the pixel data included in the sequential pixel data Gp. The sorting process is a process to sort the order of the pixel data included in the sequential pixel data Gp.

The first processing unit 1 includes the similarity calculation unit 1A, the position determination unit 1B, the sorting unit 1C, and the order acquisition unit 1D. The first processing unit 1 outputs the pixel data that has been sorted to the image processing unit 3. The pixel data that has been sorted corresponds to the output pixel data. Also, the position determination unit 1B corresponds to a determination unit.

2-1-1. Similarity Calculation Unit 1A

The similarity calculation unit 1A calculates the similarity of the pixel data included in the sequential pixel data Gp for the respective sequential pixel data Gp. The similarity is an indicator of how well the bit data of the pixel data matches. For example, in the case of 3-bit data, the 3-bit data (1,1,1) is more similar to the 3-bit data (1,1,0) than to the 3-bit data (0,0,0). The former is because all the bit data is different, while the latter is because the 2-bit data are the same. In an embodiment, the similarity corresponds to the hamming distance. More specifically, the similarity is based on the hamming distance between adjacent pixel data. That is, the similarity calculation unit 1A calculates the hamming distance (the similarity) between adjacent pixel data included in the sequential pixel data Gp.

The hamming distance corresponds to the number of replacement, required to transform any bit of data into another hit of data. For example, the hamming distance between the 3-bit data (1, 1, 1) and the 3-bit data (0, 0, 0) are 3, since all (three) bit data must be replaced. The hamming distance between the 3-bit data (1, 1, 1) and the 3-bit data (1, 1, 0) is 1, since only the least significant bit of data must be replaced. Thus, the larger the hamming distance, the less similar the adjacent the pixel data are, and the smaller the hamming distance, the more similar the adjacent pixel data are.

Figure 2:
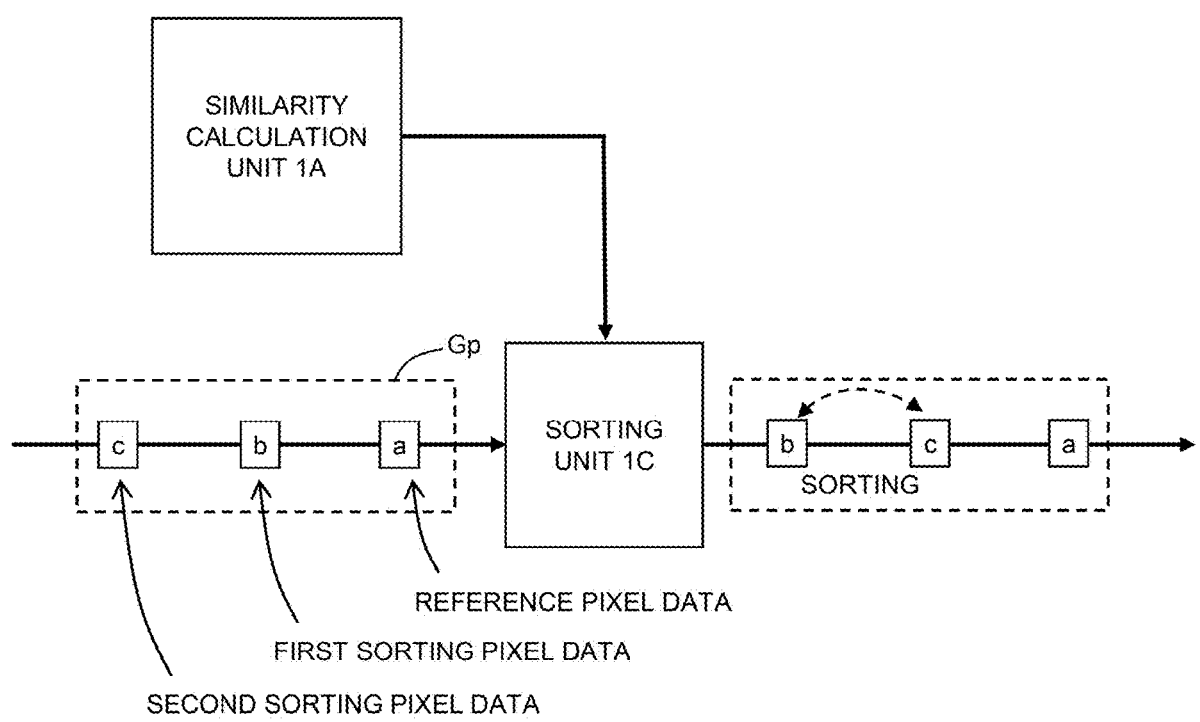
FIG. 2 is a functional diagram of a similarity calculation unit 1A and a sorting unit 1C relating to the embodiment.
Figure 3:
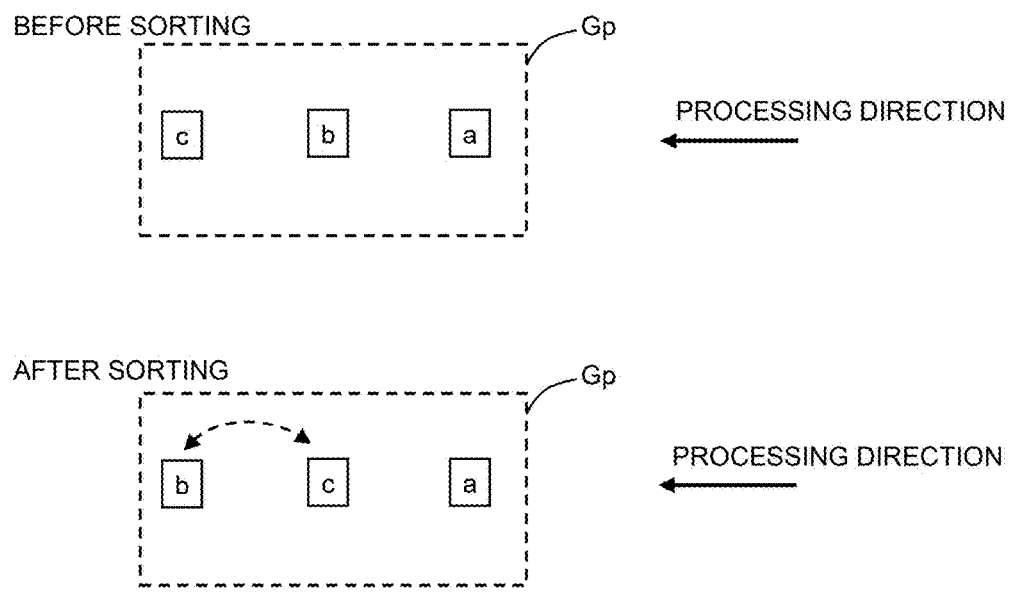
FIG. 3 is a description diagram of hamming distances before and after sorting in the embodiment.

Next, based on FIG. 2 and FIG. 3, the method of calculating the similarity based on the hamming distance is explained. In the embodiment, the number of pixel data included in the sequential pixel data Gp is 3. The larger the number of pixel data included in the sequential pixel data Gp, the larger the number of pixel data to be referenced, and the higher the possibility that the toggle rate will be reduced by sorting. On the other hand, the larger the number of pixel data included in the sequential pixel data Gp, the larger the calculation amount of the hamming distance, and as a result, the increased amount of power consumption due to the increase in the calculation amount of the hamming distance may exceed the decrease amount of power consumption due to the reduction in the toggle rate. In other words, the number of pixel data included in the sequential pixel data Gp is not necessarily large. Considering this, in the embodiment, the number of pixel data included in the sequential pixel data Gp is set to 3.

As shown in FIGS. 2 and 3, the sequential pixel data Gp includes, in order from the top, the reference pixel data a, the first sorting pixel data a, and the second sorting pixel data c. The reference pixel data a is the beginning pixel data and is not the target of sorting. In other words, the reference pixel data a is fixed at the beginning. This is because if the reference pixel data a is not fixed, the toggle rate may be increased in relation to the pixel data at the end of the sequential pixel data Gp, which has been sorted first. That is, even though the toggle rate of the sequential pixel data Gp has been reduced, the toggle rate of the sequential pixel data Gp may be increased by a later sorting process. The first sorting pixel data b and the second sorting pixel data c are the second and third the pixel data, respectively, and are the target of sorting.

The similarity calculation unit 1A calculates the total of the hamming distances D0 of the sequential pixel data Gp in the state before sorting, and the total of the hamming distances D1 of the sequential pixel data Gp in the state after sorting, as shown in FIG. 3. The total of the hamming distances D0 corresponds to the first similarity, and the total of the hamming distances D1 corresponds to the second similarity.

The total of the hamming distances D0 of the sequential pixel data Gp in the state before sorting is $d(a, b)+d(b, c)$. $d(a, b)$ is the hamming distance between the adjacent pixel data, which are the reference pixel data a and the first sorting pixel data b. $d(b, c)$ is the hamming distance between the adjacent pixel data, which are the first sorting pixel data b and the second sorting pixel data c.

The total of the hamming distances D1 of the sequential pixel data Gp in the state after sorting is $d(a, c)+d(c, b)$. $d(a, c)$ is the hamming distance between the adjacent pixel data, which are the reference pixel data a and the second sorting pixel data c. $d(c, b)$ is the hamming distance between the adjacent pixel data, which are the second sorting pixel data c and the first sorting pixel data b.

Note that $d(b, c)$ and $d(c, b)$ are equal.

If the value obtained by subtracting the total of the hamming distances D1 from the total of the hamming distances D0 is larger than 0, the total of the hamming distances is smaller in the sorted arrangement of the pixel data, so the toggle rate is reduced by sorting. In other words, in this case, there is an advantage to sorting.

On the other hand, if the value obtained by subtracting the total of the hamming distances D1 from the total of the hamming distances D0 is less than or equal to 0, the arrangement of the pixel data after sorting does not change the total of the hamming distances, or rather the total of the hamming distances becomes larger. In this case, the toggle rate is considered to not change, or to increase. In other words, in this case, there is no advantage to sorting, because sorting does not reduce the toggle rate.

2-1-2. Position Determination Unit 1B the position determination unit 1B determines the beginning position of the sequential pixel data. The beginning position of the sequential pixel data Gp shifts sequentially, as shown in FIGS. 5A to 5H. Here, the method of shifting the beginning position of the sequential pixel data Gp is different between the cases in which the sorting unit 1C determines to sort the sequential pixel data and the cases in which it does not determine to sort the sequential pixel data. In other words, the position determination unit 1B determines the beginning position of the sequential pixel data according to the result of the sorting unit 1C.

In an embodiment, the number of sequential pixel data is three. Therefore, if the sorting unit 1C determines that the sequential pixel data Gp is to be sorted, the position determination unit 1B will shift the beginning position by 2 (=3−1). If the sorting unit 1C determines that the sequential pixel data Gp is not to be sorted, the position determination unit 1B will shift the beginning position by 1. The details of the configuration and operation of the position determination unit 1B will be described later in "3. SORTING PROCESS".

2-1-3. Sorting Unit 1C

The sorting unit 1C has the function of comparing the similarity between large and small relationships. In an embodiment, the sorting unit 1C compares the total of the hamming distances D0 with the total of the hamming distances D1. The sorting unit 1C also has the function of sorting the sequential pixel data Gp. The sorting unit 1C sorts the pixel data included in the sequential pixel data Gp based on the similarity (the totals of the hamming distances D0, D1). In other words, the sorting unit 1C sorts the pixel data included in the sequential pixel data Gp based on the large and small relationship between the total of the hamming distances D0 and the total of the hamming distances D1.

The sorting unit 1C sorts the pixel data in the case that the total of the hamming distances becomes small by sorting the pixel data. In other words, in the case that the pixel data is 1-bit monochrome pixel data, the sorting unit 1C will sort the pixel data if the total of the hamming distances D0 is greater than the total of the hamming distances D1. In this way, the toggle rate of the image processing unit 3 is reduced by sorting the pixel data in advance before the pixel data is input to the image processing unit 3. This allows the image processing device 100 to suppress the power consumption (logic power) in the image processing unit 3.

In addition, the sorting unit 1C does not necessarily need to sort the pixel data even if the total of the hamming distances D0 is larger than the total of the hamming distances D1. In other words, if the difference between the total of the hamming distances D0 and the total of the hamming distances D1 is greater than a predetermined value (corresponding to the threshold K in step S3 of FIG. 6), the pixel data may be sorted. The details of the configuration and operation of the sorting unit 1C will be described later in "3. SORTING PROCESS".

2-1-4. Order Acquisition Unit 1D

The order acquisition unit 1D acquires the order data. The order data is data that defines the order (position) of the pixel data in the state before and after sorting. The order data is used to restore the order (position) of the sorted pixel data to the original order. The order acquisition unit 1D outputs the acquired order data to the second processing unit 2.

2-2. Second Processing Unit 2

The second processing unit 2 includes the restoration unit 2A. The second processing unit 2 is input the pixel data, which has been processed by the sorting unit 1C, and the order data, which has been acquired by the order acquisition unit 1D.

2-2-1. Restoration Unit 2A

As described above, the first processing unit 1 reduces the toggle rate in the image processing unit 3, but as a result, the order of the pixel data has been changed. If the pixel data is still output to the display unit 20, the correct image will not be displayed on the display unit 20. Then, the restoration unit 2A restores the order (position) of the pixel data based on the order data. Then, the pixel data restored by the restoration unit 2A is output to the display unit 20. This allows the desired image to be displayed on the display unit 20.

2-3. Image Processing Unit 3

The image processing unit 3 performs predetermined image processing on the image data. The predetermined image processing is, for example, gamma correction, tone correction, luminance correction, or a combination of these. As the sorting process described below is performed, the toggle rate in the image processing unit 3 is reduced, and the power consumption (logic power consumption) of the image processing unit 3 is reduced. Note that some image processing, such as filter processing, depends on the arrangement of pixels for the result of the processing. If the image processing unit 3 performs the filtering process on data that has been processed by the sorting process described below, the desired image may not be displayed on the display unit 20. Therefore, the predetermined image processing to be performed by the image processing unit 3 is not limited, as long as the result of the processing does not depend on the arrangement of the pixels.

3. SORTING PROCESS

Figure 4A:
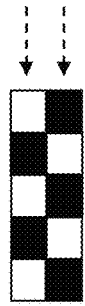
FIG. 4A shows an example of a grayscale image with only black and white.

An example of the sorting process in the sorting unit 1C is described based on FIG. 4A to FIG. 5H. For the purpose of description, the case, where 1-bit monochrome image data shown in FIG. 4A is input to the image processing device 100, is described as an example. As shown in FIG. 4A, the image data includes 10 of the pixel data. The pixel data (input pixel data) is assigned an order from top to bottom in column 1, then from top to bottom in column 2, as shown in FIG. 4A. The method of assigning the order is not limited, and various methods may be employed. For example, the pixel data may be assigned the order in the row direction (horizontal direction). As shown in FIG. 4B, the pixel data Dt1, which is assigned the order, is sorted by the sorting unit 1C and transformed into the pixel data Dt2.

This section describes the process of converting the pixel data Dt1 to the pixel data Dt2. As shown in FIG. 5A, first, the sorting process is performed on the pixel data from the beginning to the third (the sequential pixel data). By sorting the sequential pixel data shown in FIG. 5A into the arrangement shown in FIG. 5B, the total of the hamming distances becomes smaller. For this reason, the sorting unit 1C can sort the sequential pixel data shown in FIG. 5A into the arrangement shown in FIG. 5B.

The next sequential pixel data Gp is the pixel data from the third to the fifth from the beginning. In other words, the position determination unit 1B shifts the beginning position of the sequential pixel data by 2. The next sequential pixel data is not the pixel data from the second to the fourth from the beginning. If the next sequential pixel data Gp is set to be the pixel data from the second to the fourth from the beginning, the sorted pixel data may be sorted again. That is, the pixel data of the third from the beginning is initially the pixel data of the second from the beginning, which has already been sorted. Here, as described below, the second processing unit 2 restores the arrangement of the pixel data to its original state, so if the third pixel data is further sorted, the processing to restores it to its original state will increase. Therefore, in the embodiment, once the pixel data is sorted, it will not be sorted. In other words, the position determination unit 1B determines the sequential pixel data so that the already sorted pixel data will not be sorted again, and if the number of sequential pixel data Gp is 3, the beginning position of the sequential pixel data Gp is shifted by 2. To generalize, the position determination unit 1B should shift the beginning position of the sequential pixel data Gp by N−1 if the number of sequential pixel data is N.

Even if the sequential pixel data Gp shown in FIG. 5C is sorted, the total of the hamming distances does not become smaller, so it is not sorted. The next sequential pixel data Gp will be the pixel data from the fourth to the sixth from the beginning, as shown in FIG. 5D. In other words, the position determination unit 1B should shift the beginning position of the sequential pixel data by 1 if the sequential pixel data Gp is not sorted. To generalize, the position determination unit 1B should shift the beginning position of the sequential pixel data Gp by 1 if the number of sequential pixel data is N.

By sorting the sequential pixel data Gp shown in FIG. 5D into the arrangement shown in FIG. 5E, the total of the hamming distances becomes smaller. For this reason, the sequential pixel data shown in FIG. 5D is sorted into the arrangement shown in FIG. 5E. The next sequential pixel data is the pixel data from the sixth to the eighth from the beginning, as shown in FIG. 5F. In other words, the beginning position of the sequential pixel data is shifted by 2.

Even if the sequential pixel data Gp shown in FIG. 5F is sorted, the total of the hamming distances does not become smaller, so it is not sorted. The next sequential pixel data Gp is the pixel data from the seventh to the ninth from the beginning, as shown in FIG. 5G. In other words, the beginning position of the sequential pixel data is shifted by 1. By sorting the sequential pixel data Gp shown in FIG. 5G into the arrangement shown in FIG. 5H, the total of the hamming distances becomes smaller. Therefore, the sequential pixel data shown in FIG. 5G is sorted into the arrangement shown in FIG. 5H.

Figure 4B:
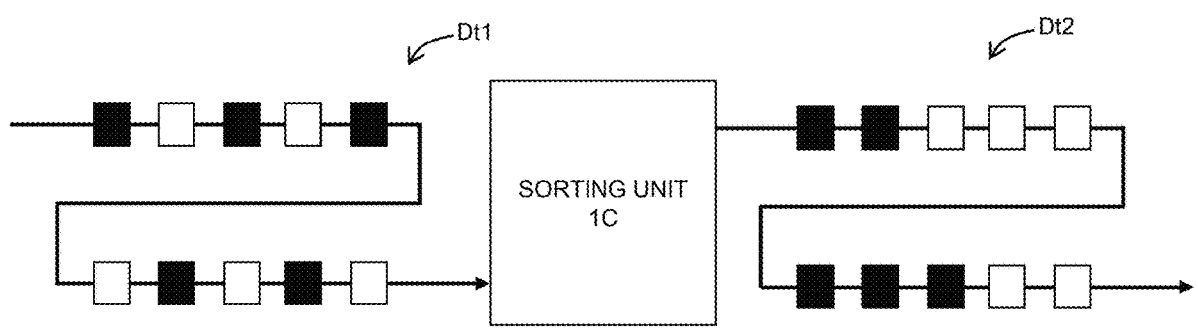
FIG. 4B schematically shows the grayscale shown in FIG. 4A processed by the sorting unit 1C.

By following the above process, the arrangement of the pixel data shown in FIG. 5A is transformed into the arrangement of the pixel data shown in FIG. 5H (arrangement of the pixel data Dt2 shown in FIG. 4B).

4. FLOWCHART

Figure 6:
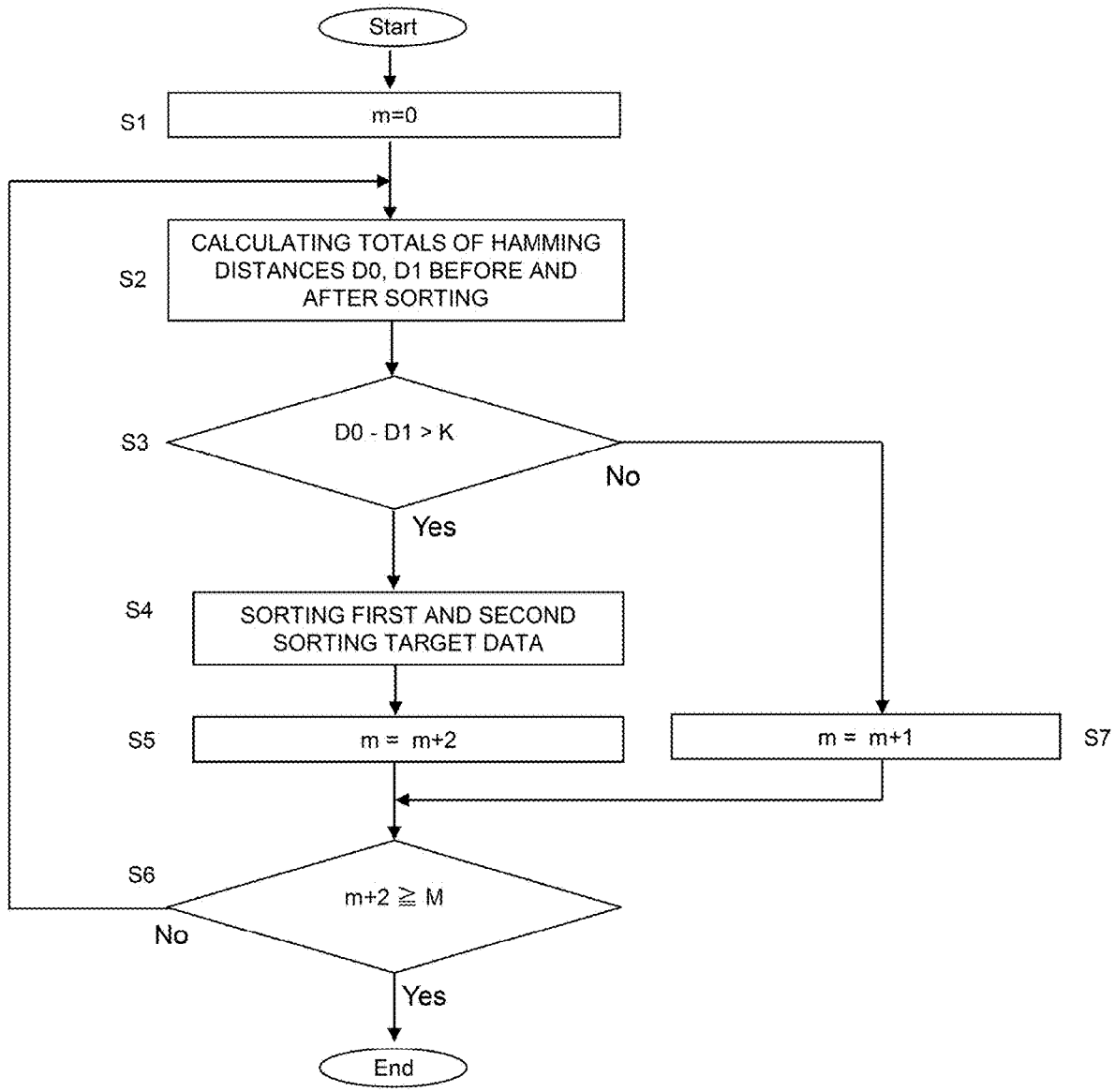
FIG. 6 shows a control flow of the image processing device relating to the embodiment.

Based on FIG. 6, the flowchart of the sorting process of the image processing device 100 is described.

The position determination unit 1B assigns positions to all the pixel data, and sets the position m of the pixel data at the beginning of the sequential pixel data to 0 (Step S1). Here, the pixel data is assigned a position from 0 to M, where M is any integer greater than or equal to 3. M is the position assigned to the end of the pixel data among all the pixel data. For example, if all the pixel data is in the form shown in FIG. 4A, then M is 9.

Next, the similarity calculation unit 1A calculates the total of the hamming distances D0 of the sequential pixel data Gp in the state before sorting and the total of the hamming distances D1 of the sequential pixel data in the state after sorting (Step S2).

The sorting unit 1C determines whether the value obtained by subtracting the total of the hamming distances D1 from the total of the hamming distances D0 is larger than the threshold K (Step S3). The threshold K is 0, for example, if the pixel data is 1 bit, as described in FIG. 4A to FIG. 5H. If the pixel data is a plurality of bits, an integer larger than 0 can be employed.

If the value obtained by subtracting the total of the hamming distances D1 from the total of the hamming distances D0 is larger than the threshold K, it shifts to step S4. The sorting unit 1C sorts the order (position) of the pixel data so that the hamming distance becomes small (Step S4). Then, the position determination unit 1B adds 2 to the position m of the pixel data at the beginning of the sequential pixel data Gp (Step S5). In the embodiment, since the number of sequential pixel data is 3, the number to be added to the position m in step S5 is 2 (=3-1). If the number of sequential pixel data is N (N is an integer larger than 3), then the number to be added to position m in step S5 is N-1. Thus, by setting the number to be added to the position m, the position determination unit 1B determines the beginning position of the sequential pixel data Gp so that the sorted pixel data is not sorted again.

If the value obtained by subtracting the total of the hamming distances D1 from the total of the hamming distances D0 in step S3 is less than or equal to the threshold K, it shifts to step S7. Then, the position determination unit 1B adds 1 to the position m of the pixel data at the beginning of the sequential pixel data Gp (Step S7).

The position determination unit 1B determines whether the value obtained by adding 2 to the position m is larger than or equal to M (Step S6). In step S6, it is determined whether the sequential pixel data Gp has reached the end of all the pixel data or not. If the value obtained by adding 2 to the position m is not equal to or larger than M, return to step S2 and repeat step S3, etc. as described above. If the value obtained by adding 2 to the position m is equal to or larger than M, this flowchart is ended.

This section describes the meaning of setting the threshold K in step S3 above. If the pixel data can be sorted again, the arrangement of all pixel data after sorting process may be similar, even if the threshold K is high or low, as a result of the pixel data being sorted many times. However, in the embodiment, as described above, the pixel data that has been sorted is not sorted again. Therefore, the arrangement of all pixel data after sorting process can show different behavior when the threshold K is high or low.

If the threshold K is set high, for example, only the pixel data that has a large effect on reducing the toggle rate will be sorted, while the pixel data that has a small effect on reducing the toggle rate will not be sorted. Setting the threshold K to a higher value increases the tendency as described next.

That is, there is a possibility that there is the pixel data that effectively reduces the toggle rate in the sequential pixel data Gr that is coming next, there is a strong tendency to leave the pixel data of the sequential pixel data Gr, which is the current target of sorting, unsorted. In other words, there is a stronger tendency to expect the effect of reducing the toggle rate of the sequential pixel data Gr that is coming next.

On the other hand, if the threshold K is set low, for example, both the pixel data that has a large effect on reducing the toggle rate and the pixel data that has a small effect on reducing the toggle rate will be sorted. Setting the threshold K to a lower value increases the tendency as described next.

That is, there is a possibility that there is pixel data in the next sequential pixel data Gr that will reduce the toggle rate more effectively, but sorting the pixel data in the sequential pixel data Gr, which is the current target of sorting, is expected to reduce the toggle rate by a small amount. Therefore, there is a strong tendency to leave the pixel data of the sequential pixel data Gr, which is the current target of sorting, sorted. In other words, there is a stronger tendency to determine early the effect of reducing the toggle rate of the sequential pixel data Gr.

5. MODIFICATION

The embodiment may be the following configuration.
5-1. Modification 1: Number of Sequential Pixel Data is Equal to 4

The modification 1 is explained based on FIGS. 7 to 10. In the embodiment, the number of sequential pixel data is 3, while in the modification 1, the number of sequential pixel data is 4. If the number of sequential pixel data is 3, the total of the hamming distances may become rather large as a result of the pixel data being sorted. The reason is that the sequential pixel data consists of the reference pixel data (first pixel data), the first sorting pixel data (second pixel data), and the second sorting pixel data (third pixel data) in order from the beginning, and the sequential pixel data does not have the reference pixel data at the end. That is, when the first sorting pixel data and the second sorting pixel data are sorted, although the total of the hamming distances becomes smaller in relation to the first to third pixel data, the total of the hamming distances does not reflect the hamming distance in relation to the fourth pixel data. Therefore, as a result of sorting the pixel data, the hamming distance may become rather large depending on the number of bits in the pixel data, the threshold K, and the upper bits of the pixel data which is the target of the calculation described below.

In this manner, the configuration of the embodiment determines whether or not to sort the pixel data without considering the fourth pixel data, although there is a possibility that the total of the hamming distances may become large.

If the sorting process reduces the total of the hamming distances more reliably, the number of sequential pixel data should be larger. On the other hand, if the number of sequential pixel data becomes large, the amount of calculation for the hamming distance in the sorting process will increase. Therefore, if the number of sequential pixel data is set to 4, as in the modification 1, the sorting process can reduce the hamming distance more reliably, while the amount of calculation for the hamming distance in the sorting process can be reduced.

Figure 7:
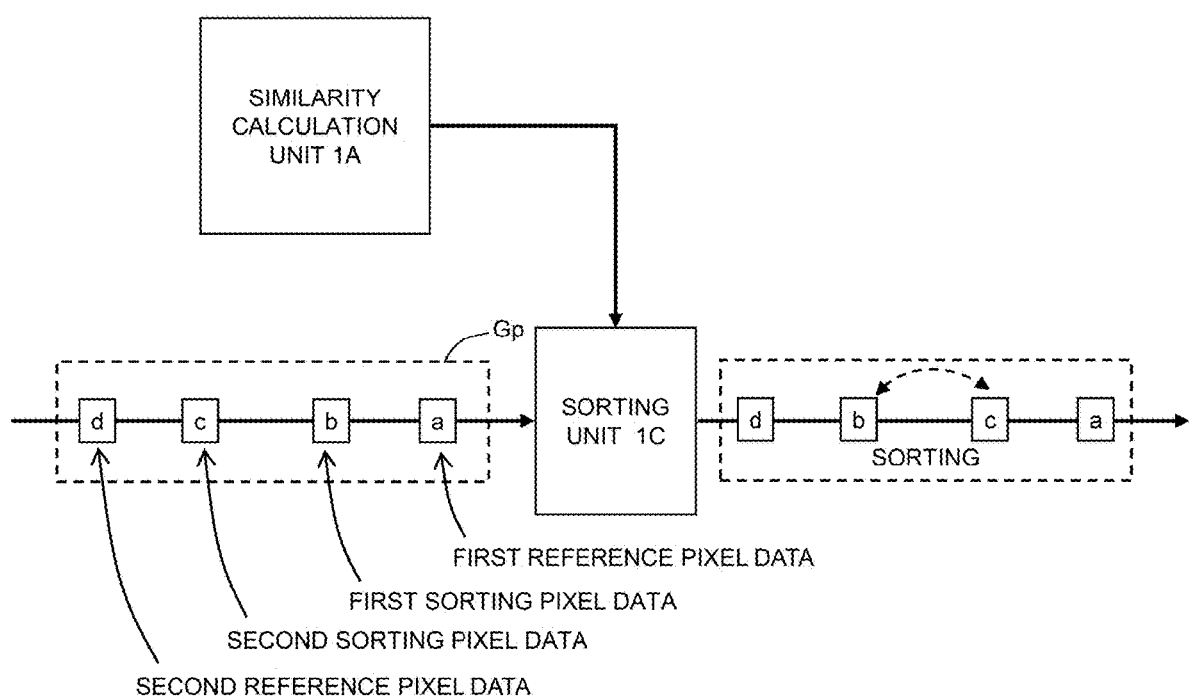
FIG. 7 is a functional diagram of the similarity calculation unit 1A and the sorting unit 1C relating to the modification 1.
Figure 9:
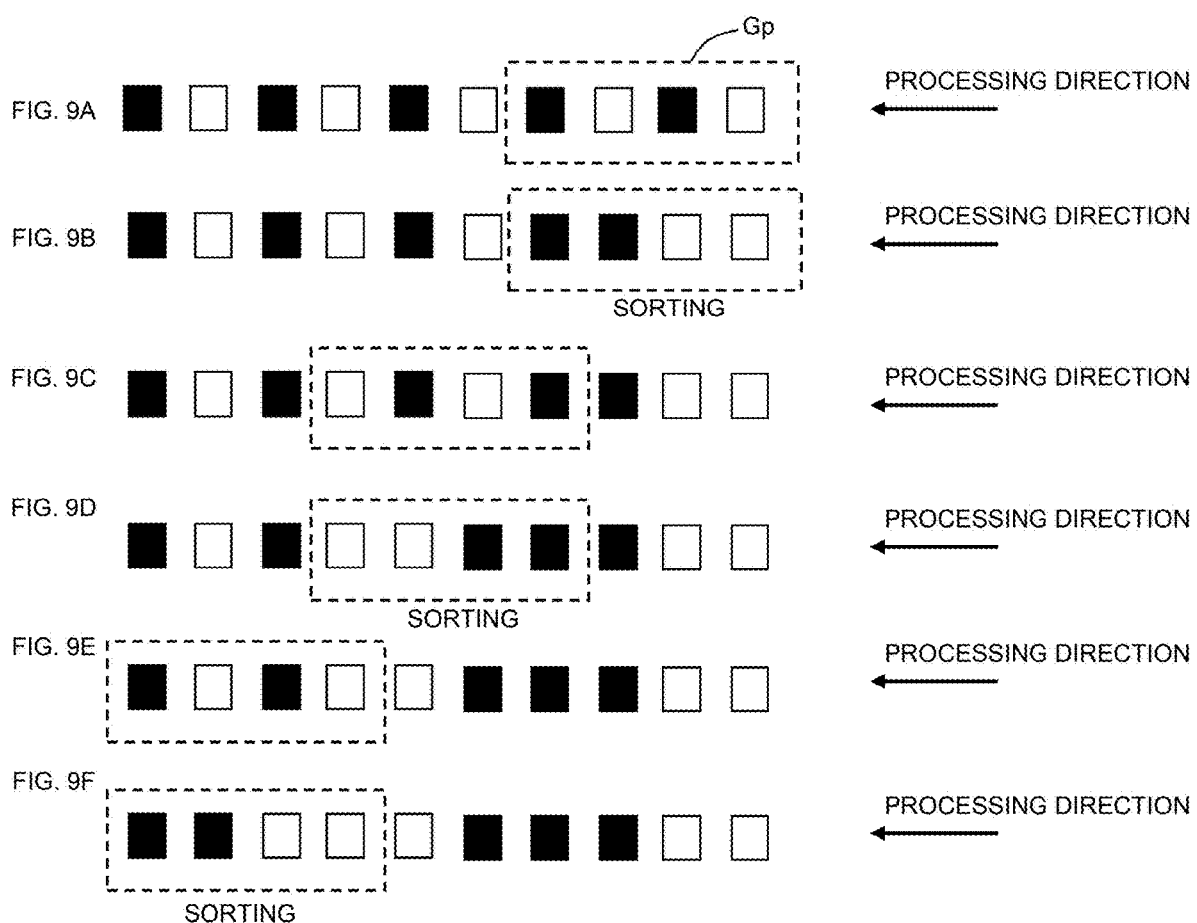
FIGS. 9A to 9F shows the image processing device relating to the modification 1 performing a sequential sorting process on the pixel data included in the sequential pixel data Gp.

In the modification 1, the description of the parts common to the embodiment is omitted. As shown in FIG. 7, the sequential pixel data Gp includes, in order from the beginning, the first reference pixel data a, the first sorting pixel data b, the second sorting pixel data c, and the second reference pixel data d. The first reference pixel data a and the second reference pixel data d are fixed. The pixel data for the target of sorting is the first sorting pixel data b and the second sorting pixel data c.

As shown in FIG. 8, the total of the hamming distances D0 of the sequential pixel data Gp in the state before sorting and the total of the hamming distances D1 of the sequential pixel data Gp in the state after sorting is as follows.

The total of the hamming distances D0 of the sequential pixel data Gp in the state before sorting is d(a, b)+d(b, c)+d(c, d). d(a, b) is the hamming distance between the adjacent pixel data, the first reference pixel data a and the first sorting pixel data b. d(b, c) is the hamming distance between the adjacent pixel data, the first sorting pixel data b and the second sorting pixel data c. d(c, d) is the hamming distance between the adjacent pixel data, the second sorting pixel data c and the second reference pixel data d.

The total of the hamming distances D1 of the sequential pixel data Gp in the state after sorting is d(a, c)+d(c, b)+d(b, d). d(a, c) is the hamming distance between the adjacent pixel data, the first reference pixel data a and the second sorting pixel data c. d(c, b) is the hamming distance between the adjacent pixel data, the second sorting pixel data c and the first sorting pixel data b. d(b, d) is the hamming distance between the adjacent pixel data, the first sorting pixel data b and the second reference pixel data d.

Note that d(b, c) and d(c, b) are equal.

As shown in FIGS. 9A to 9F, the sorting process is performed sequentially for the modification 1 in the same way as in the embodiment. As shown in FIG. 9A, the sorting process is performed on the pixel data from the beginning to the fourth (the sequential pixel data Gp). By sorting the sequential pixel data shown in FIG. 9A into the arrangement shown in FIG. 9B, the total of the hamming distances becomes smaller. Therefore, the sequential pixel data Gp shown in FIG. 9A can be sorted into the arrangement shown in FIG. 9B.

The next sequential pixel data Gp will be the pixel data from the fourth to the seventh from the beginning. That is, the beginning position of the sequential pixel data is shifted by 3. By sorting the sequential pixel data Gp shown in FIG. 9C into the arrangement shown in FIG. 9D, the total of the hamming distances becomes smaller. Therefore, the sequential pixel data Gp shown in FIG. 9C can be sorted into the arrangement shown in FIG. 9D. The following process in FIG. 9E and FIG. 9F is the same as the process in FIG. 9A and FIG. 9B and in FIG. 9C and FIG. 9D.

Figure 10:
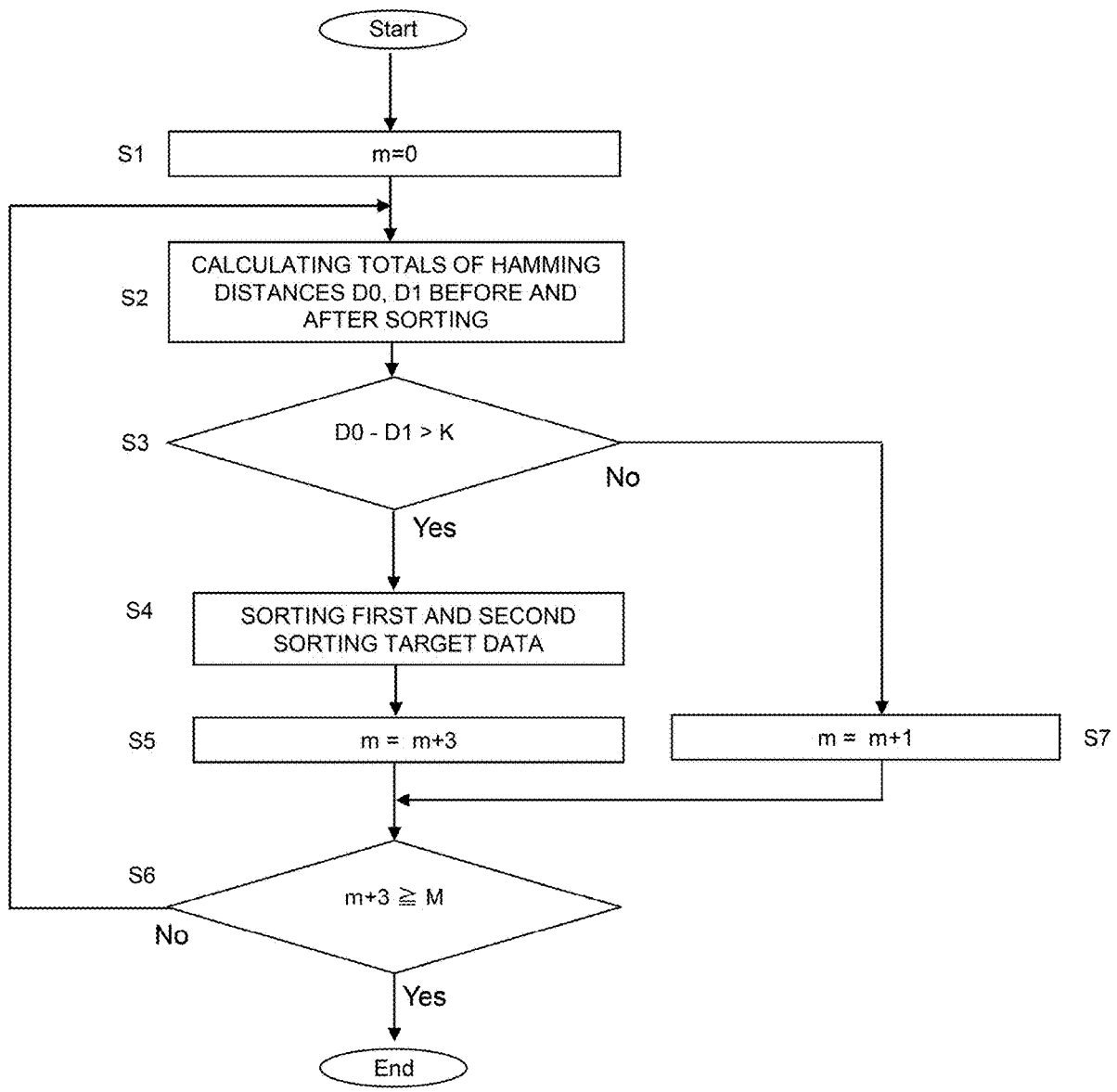
FIG. 10 shows a control flow of the image processing device relating to the modification 1.

The flowchart of the modification 1 shown in FIG. 10 has a change from the flowchart of the embodiment shown in FIG. 6 in step S5 and step S6. In step S5, the position determination unit 1B adds 3 to the position m of the pixel data at the beginning of the sequential pixel data Gp. Also, in step S6, the position determination unit 1B determines whether the value of position m added by 3 is larger than or equal to M. Other than these, FIG. 10 is the same as FIG. 6.

5-2. Modification 2: Number of Sequential Pixel Data≥5

The number of the sequential pixel data is 3 for the embodiment, and the number of the sequential pixel data is 4 for the modification 1, but the number of sequential pixel data can be 5 or more. Even if the number of sequential pixel data is more than 5, the basic configuration is the same as the modification 1. That is, the pixel data at the beginning is the first reference pixel data, and the pixel data at the end is the second reference pixel data. In addition, all the pixel data between the beginning of the pixel data and the end of the pixel data are the sorted pixel data for the target of sorting. If the number of sequential pixel data is 5 or more, there will be a plurality of pairs of the pixel data for the target of sorting, and a plurality of the total of the hamming distances D1 to be calculated. Therefore, when the number of sequential pixel data is more than 5, it is preferable to keep in mind whether the power consumption can be suppressed as a result of performing the sorting process.

5-3. Modification 3: Image Processing Device 100A and Image Processing Device 100B

5-3-1. Configuration 1

Figure 11:
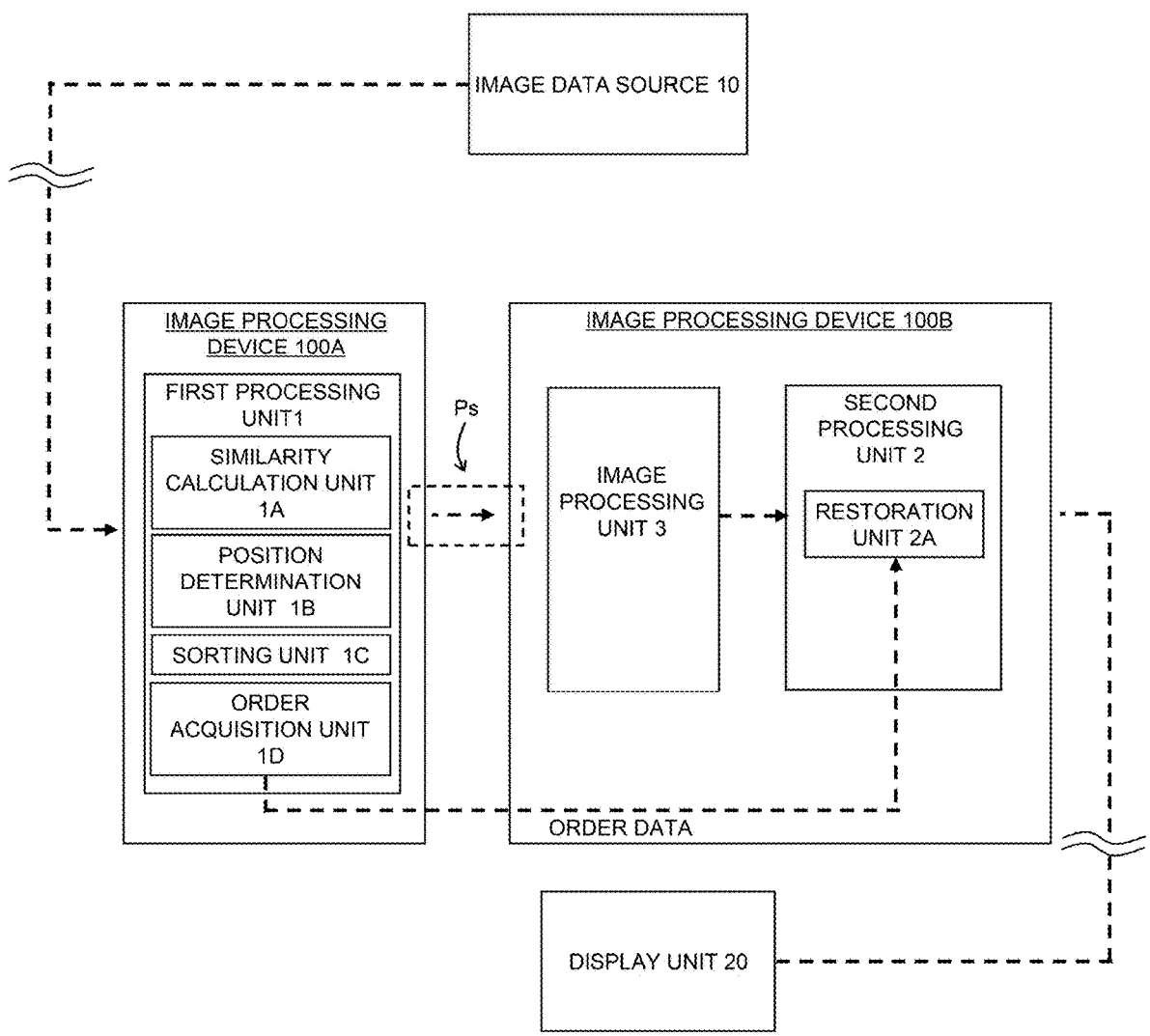
FIG. 11 is a functional block diagram of the image processing device 100A and the image processing device 100B relating to the modification 2.

In the embodiment, the image processing device 100 is in the configuration of having both the first processing unit 1 and the second processing unit 2. As shown in FIG. 11, in the configuration 1 of the modification 3, the image processing device 100A includes the first processing unit 1 and the image processing device 100B includes the second processing unit 2. The image processing device 100 B also includes the image processing unit 3. That is, in the configuration 1 of the modification 3, the pixel data performed the sorting process (output pixel data) is exchanged between the independent image processing devices.

The pixel data that has performed the sorting process in the image processing device 100A and the order data are output from the image processing device 100A to the image processing device 100B. Then, the pixel data is performed the predetermined image processing by the image processing unit 3, and then the order is restored by the restoration unit 2A. The same effect (suppression of logic power in the image processing unit 3) can be obtained even in the configuration 1 of the modification 3. Also, in the configuration shown in FIG. 11, the toggle rate of the transmission path Ps (see the rectangular dashed area in FIG. 11) is reduced, and the power consumption of the transmission path Ps is also reduced. The switching noise in the transmission path Ps will also be reduced. Here, the transmission path Ps includes I/O terminals (input/output terminals) that connect the image processing device 100A and the image processing device 100B.

5-3-2. Configuration 2

Figure 12:
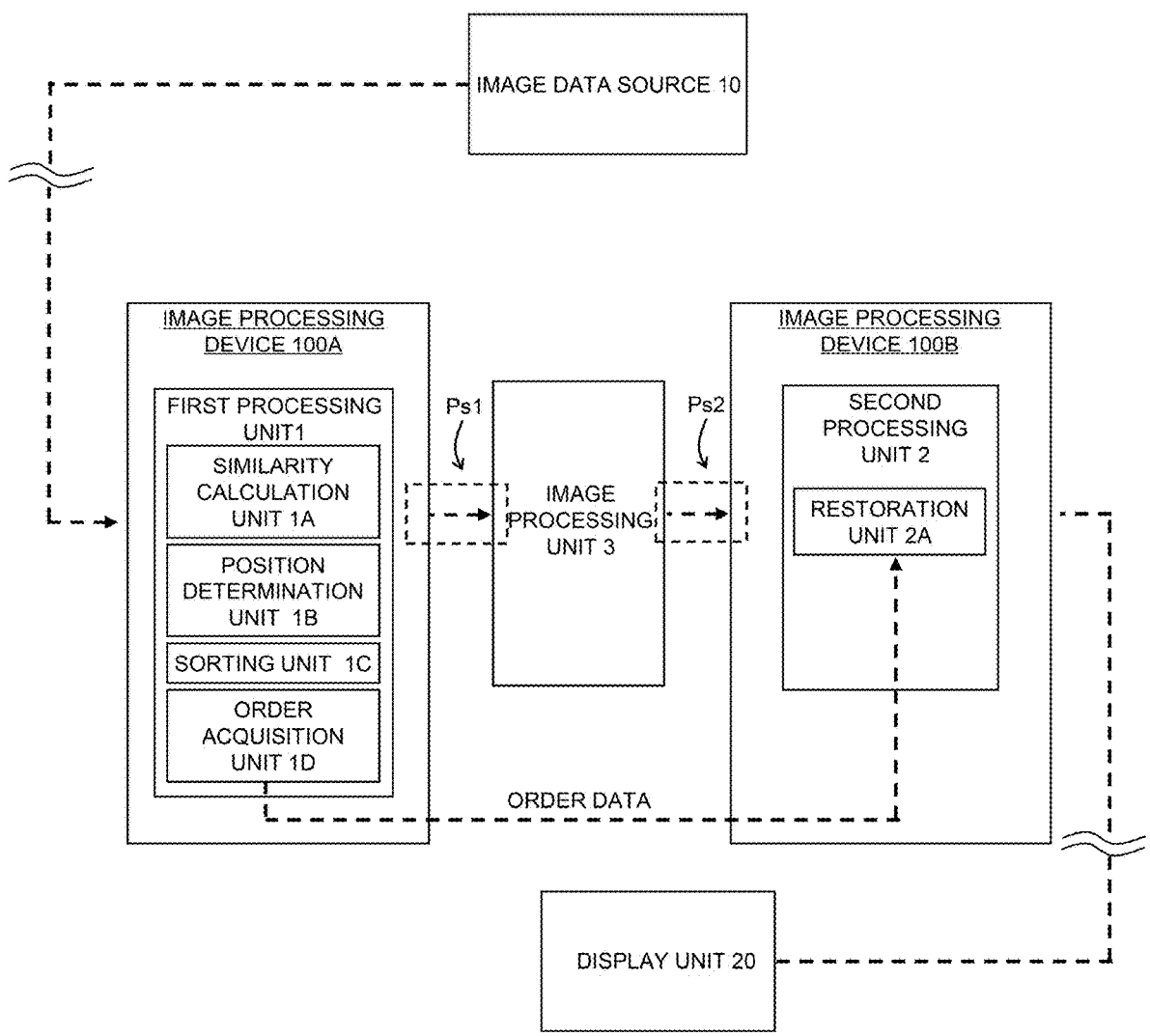
FIG. 12 a functional block diagram of the image processing device 100A and the image processing device 100B relating to the modification 3.

As shown in FIG. 12, the image processing unit 3 may be independent of the image processing device 100A with the first processing unit 1 and the image processing device 100B with the second processing unit 2. The pixel data that has been performed the sorting process by the image processing device 100A is output from the image processing device 100A to the image processing unit 3. The pixel data output to the image processing unit 3 is performed the predetermined image processing by the image processing unit 3, and then output from the image processing unit 3 to the image processing device 100B. The pixel data output to the image processing device 100B is restored to its original order by the restoration unit 2A. The same effect (suppression of logic power in the image processing unit 3) can be obtained even in the configuration 2 of the modification 3. Also, in the configuration 2 shown in FIG. 12, the toggle rate of the transmission path Ps1 and the transmission path Ps2 is reduced, and the power consumption of the transmission path Ps1 and the transmission path Ps2 is also reduced. The switching noise on the transmission path Ps1 and the transmission path Ps2 is also reduced. Here, the transmission path Ps1 includes the I/O terminals (input/output terminals) that connect the image processing device 100A to the image processing unit 3, and the transmission path Ps2 includes the I/O terminals (input/output terminals) that connect the image processing unit 3 to the image processing device 100B.

5-3-3. Configuration 3

In the configuration shown in FIG. 11, the image processing device 100B includes the image processing unit 3, but instead of the image processing device 100B, the image processing device 100A may include the image processing unit 3 (not shown in Fig.).

In this configuration 3, the same effect as described in the configuration 1 of the modification 3 above can be obtained. That is, this configuration 3 has the same effect (suppression of logic power in the image processing unit 3) as the embodiment. In addition, this configuration 3 reduces the toggle rate and power consumption of the transmission path (I/O terminals) connecting the image processing device 100A and the image processing device 100B, and reduces the switching noise in the transmission path.

5-3-4. Configuration 4

Also, the image processing device 100A and the image processing device 100B may include the image processing unit 3 respectively (not shown in Fig.). In this configuration 4, the pixel data is output from the first processing unit 1 of the image processing device 100A to the image processing unit 3 of the image processing device 100A. In addition, the pixel data output to the image processing unit 3 is output from the image processing unit 3 of the image processing device 100B to the second processing unit 2 of the image processing device 100B.

In this configuration 4, the same effects as those described in the configuration 1 of the modification 3 above can be obtained. That is, this configuration 4 has the same effect (suppression of logic power in the image processing unit 3 of the image processing device 100A and the image processing device 100B) as the embodiment. Also, this configuration 4 reduces the toggle rate and power consumption of the transmission path (I/O terminals) connecting the image processing device 100A to the image processing device 100B, and reduces the switching noise in the transmission path.

5-3-5. Configuration 5

Also, the configuration 1 through 4 of the modification 3 described above is the configuration in which the pixel data goes through the image processing unit 3, but it is not limited to this. That is, even if the image processing device 100A and the image processing device 100B do not have the image processing unit 3, and the pixel data is output from the first processing unit 1 of the image processing device 100A to the second processing unit 2 of the image processing device 100B without going through the image processing unit 3, the following effects can be obtained. In other words, this configuration 5 reduces the toggle rate and power consumption of the transmission path (I/O terminals) connecting the image processing device 100A to the image processing device 100B, and reduces the switching noise in the transmission path.

5-3-5. Configuration 6

Even if the image data output from the image processing device 100A is stored in a memory (external memory) that is separate from the image processing device 100A, the effects described in the configurations 1 through 5 of the modification 3 can be obtained. For example, even if the image data output from the image processing device 100A is stored in an external memory and then output to the image processing device 100B, the effects described in the configurations 1 through 5 of the modification 3 can be obtained.

5-4. Modification 4: Use Higher Bits to Calculate Total of the Hamming Distances In the embodiment, the case where the pixel data is 1 bit is described for convenience of explanation, however, the pixel data is often 8 bits. In the modification 4, the similarity calculation unit 1A calculates the total of the hamming distances for the upper bits of the pixel data.

To calculate the total of the hamming distances D0 and D1, all 8 bits may be calculated, but this will increase the amount of calculation.

Also, in the image processing unit 3, predetermined processing is performed, but it is highly unlikely that any processing will affect the higher bits of the pixel data, i.e., any processing that will drastically change the tone of the pixel. Conversely, it is highly likely that processing will be performed that will affect the lower bits of the pixel data. Therefore, even if the hamming distance is calculated including the lower bits and the sorting process is performed on the pixel data, the lower bits may change in the image processing unit 3, and as a result, the toggle rate may not be reduced for the lower bits.

Then, by calculating the total of the hamming distances for the upper bits of the pixel data as in the modification 4, the following effect can be obtained.

(1) The amount of calculation can be reduced.

(2) The effect on the total of the hamming distances of the lower bits, which have a limited effect on reducing the toggle rate, can be suppressed, and the effect on the total of the hamming distances of the upper bits, which have a large effect on reducing the toggle rate, can be increased. As a result, the toggle rate can be effectively reduced.

Here, the bits targeted in the modification 4, for example, can be the upper 40% or more but lower than 60%, or can be the upper 50% or more of the bits.

5-5. Modification 5: Configurations Other than Hamming Distance

In the embodiment, the similarity corresponds to the hamming distance, but it is not limited to this. The similarity can also correspond to a format other than the hamming distance. For example, the similarity can be a value (output value of the EXOR circuit) that indicates the match or mismatch of the bits of adjacent pixel data.

REFERENCE SIGNS LIST

1: first processing unit
1A: similarity calculation unit
1B: position determination unit
1C: sorting unit
1D: order acquisition unit
2: second processing unit
2A: restoration unit
2B: input unit
3: image processing unit
10: image data source
20: display unit
100: image processing device
100A: image processing device
100B: image processing device
D0: total of the hamming distances
D1: total of the hamming distances
Dt1: pixel data
Dt2: pixel data
Gp: sequential pixel data
a: reference pixel data (first reference pixel data)
b: first sorting pixel data
c: second sorting pixel data
d: second reference pixel data
Ps: transmission path
Ps1: transmission path
Ps2: transmission path

The invention claimed is:

1. An image processing device that processes image data comprising:
a first processing unit including a similarity calculation unit and a sorting unit, wherein
the first processing unit is configured to receive input pixel data and output output pixel data,
the input pixel data includes sequential pixel data which is pixel data having N sequential pixel data (N≥3), and the pixel data has a plurality of bits,
the output pixel data includes data in which the pixel data included in the sequential pixel data is sorted based on a similarity of the pixel data included in the sequential pixel data,
the similarity calculation unit calculates the similarity of the pixel data included in the sequential pixel data for the respective sequential pixel data, based on a hamming distance between adjacent the pixel data included in the sequential pixel data, and the similarity calculation unit calculates the hamming distance using upper bit of the pixel data, and
the sorting unit sorts the pixel data included in the sequential pixel data based on the similarity.

2. The image processing device of claim 1, wherein
the sorting unit sorts the pixel data included in the sequential pixel data based on first and second similarities,
the sequential pixel data has a plurality of pairs of the adjacent the pixel data,
the first similarity corresponds to a sum of the hamming distances between the plurality of pairs of the adjacent the pixel data, and
the second similarity corresponds to a sum of the hamming distances between the plurality of pairs of the adjacent the pixel data when the pixel data of the sequential pixel data corresponding to the first similarity is sorted.

3. The image processing device of claim 1, wherein
the first processing unit includes a determination unit, and
the determination unit determines the sequential pixel data so that the pixel data which has been sorted is not sorted again.

4. The image processing device of claim 1, further comprising:
a second processing unit, wherein
the second processing unit includes a restoration unit,
the first processing unit includes an order acquisition unit,
the order acquisition unit acquires order data and outputs the order data to the second processing unit,
the order data defines an order of the pixel data of the sequential pixel data in the state before the pixel data is sorted, and
the restoration unit restores the order of the pixel data of the sequential pixel data based on the order data.

5. The image processing device of claim 4, further comprising:
an image processing unit, wherein
the pixel data of the image data flows in an order of the first processing unit, the image processing unit, and the second processing unit, and
the image processing unit performs predetermined processing on the pixel data.

6. An image processing method that processes image data comprising:
an input step; a similarity calculating step; a sorting step; and an output step, wherein
in the input step, input pixel data is received to a first processing unit having a similarity calculation unit and a sorting unit, and
the input pixel data includes sequential pixel data which is pixel data having N sequential pixel data (N≥3), and the pixel data has a plurality of bits, and
in the similarity calculating step,
the similarity calculation unit calculates a similarity of the pixel data included in the sequential pixel data for the respective sequential pixel data, based on a hamming distance between adjacent the pixel data included in the sequential pixel data, and
the similarity calculation unit calculates the hamming distance using upper bit of the pixel data, and
in the sorting step, the sorting unit sorts the pixel data included in the sequential pixel data based on the similarity,
in the output step, output pixel data is output from the first processing unit,
the output pixel data includes data in which the pixel data included in the sequential pixel data is sorted in the sorting step based on the similarity.

7. A non-transitory computer readable medium that stores a computer program causing a computer to execute an image processing method that processes image data comprising:
an input step; a similarity calculating step; a sorting step; and an output step, wherein
in the input step, input pixel data is received to a first processing unit having a similarity calculation unit and a sorting unit, and
the input pixel data includes sequential pixel data which is pixel data having N sequential pixel data (N≥3), and the pixel data has a plurality of bits, and
in the similarity calculating step, the similarity calculation unit calculates a similarity of the pixel data included in the sequential pixel data for the respective sequential pixel data, based on a hamming distance between adjacent the pixel data included in the sequential pixel data, and the similarity calculation unit calculates the hamming distance using upper bit of the pixel data, and in the sorting step, the sorting unit sorts the pixel data included in the sequential pixel data based on the similarity, in the output step, output pixel data is output from the first processing unit, the output pixel data includes data in which the pixel data included in the sequential pixel data is sorted in the sorting step based on the similarity.

\* \* \* \* \*